(12) United States Patent
McCarthy et al.

(10) Patent No.: US 9,398,835 B2
(45) Date of Patent: Jul. 26, 2016

(54) INTERACTIVE TRAINING DEVICE

(71) Applicants: John Vincent McCarthy, Los Angeles, CA (US); Robert Story, W. Hollywood, CA (US)

(72) Inventors: John Vincent McCarthy, Los Angeles, CA (US); Robert Story, W. Hollywood, CA (US)

(*) Notice: Subject to any disclaimer, the term of this patent is extended or adjusted under 35 U.S.C. 154(b) by 107 days.

(21) Appl. No.: 14/257,824

(22) Filed: Apr. 21, 2014

(65) Prior Publication Data

US 2015/0297044 A1    Oct. 22, 2015

Related U.S. Application Data

(60) Provisional application No. 61/814,116, filed on Apr. 19, 2013, provisional application No. 61/895,395, filed on Oct. 24, 2013.

(51) Int. Cl.
*E03D 1/00* (2006.01)
*A47K 17/00* (2006.01)
*G09B 19/00* (2006.01)
*A47K 13/06* (2006.01)
*A47K 13/24* (2006.01)

(52) U.S. Cl.
CPC .............. *A47K 17/00* (2013.01); *A47K 13/06* (2013.01); *A47K 13/24* (2013.01); *G09B 19/0076* (2013.01); *E03D 1/00* (2013.01)

(58) Field of Classification Search
CPC ........................................................ E03D 5/10
USPC ....................................................... 4/300–442
See application file for complete search history.

(56) References Cited

U.S. PATENT DOCUMENTS

| | | | | |
|---|---|---|---|---|
| 2,028,563 | A * | 1/1936 | Rehder ................ | A47K 13/06 297/36 |
| D142,909 | S | 11/1945 | Schnittmann | |
| 2,712,653 | A * | 7/1955 | Nika .................... | A47K 13/06 297/37 |
| 2,767,408 | A * | 10/1956 | Reibman .............. | A47K 13/06 297/452.11 |
| 3,364,478 | A * | 1/1968 | Dee Waard ........... | G08B 1/08 116/67 R |
| 3,905,051 | A * | 9/1975 | Gozdziewski ....... | A47C 15/004 297/188.14 |
| 4,057,244 | A * | 11/1977 | Gaspar ................ | A47B 83/02 108/25 |
| D252,946 | S | 9/1979 | Johnson | |
| 4,174,544 | A * | 11/1979 | Furusawa ............ | A47K 11/04 4/457 |

(Continued)

FOREIGN PATENT DOCUMENTS

| CN | 201855212 U | 6/2011 |
|---|---|---|
| CN | 202827919 U | 3/2013 |

(Continued)

*Primary Examiner* — Lori Baker

(57) ABSTRACT

An interactive device that is an accessory to a flush toilet and is positioned at the rear of the flush toilet and may be attached to the rear of the toilet such that the user would use the flush toilet in the reverse position. The interactive device may include a toy, game, or computer. The interactive device may be secured to the toilet by straps or to the toilet lid hinges and may be detachable from the flush toilet. The interactive device may have hinges that allow the interactive device to be folded to a compact configuration. The interactive device makes "going to the bathroom" enjoyable for both the child and parent, while educating the child to appreciate and to become more accustomed to using a flush toilet.

20 Claims, 3 Drawing Sheets

(56) References Cited

U.S. PATENT DOCUMENTS

| | | | | |
|---|---|---|---|---|
| 4,193,142 A | * | 3/1980 | Henningfield | A47K 11/04 4/483 |
| D264,372 S | * | 5/1982 | Sachs | A47K 11/04 4/483 |
| 4,407,024 A | * | 10/1983 | Schneider | A47K 13/06 4/234 |
| 4,883,749 A | * | 11/1989 | Roberts | A47K 11/04 4/304 |
| 4,962,550 A | * | 10/1990 | Ikenaga | E03D 9/00 4/314 |
| D333,345 S | | 2/1993 | Strahan | |
| 5,509,149 A | * | 4/1996 | Lynch | G09B 19/0076 297/172 |
| 5,515,555 A | * | 5/1996 | Wormcke | E03F 1/006 4/431 |
| 5,573,407 A | * | 11/1996 | Dunford | G09B 19/0076 4/902 |
| 5,575,021 A | * | 11/1996 | Harris | A47K 11/06 4/449 |
| D378,124 S | | 2/1997 | Jordan | |
| 5,652,975 A | * | 8/1997 | Hoskin | A47K 11/04 4/483 |
| 5,681,199 A | * | 10/1997 | Morris | A63H 33/38 281/15.1 |
| 5,781,939 A | * | 7/1998 | Bledsoe | A47K 11/04 4/449 |
| 6,037,871 A | * | 3/2000 | Babylon | A47K 13/24 340/573.1 |
| 6,038,711 A | * | 3/2000 | Clarke | A47K 11/04 4/449 |
| D444,551 S | | 7/2001 | Foster | |
| 6,389,612 B1 | | 5/2002 | Harris | |
| 6,698,036 B2 | * | 3/2004 | Armbruster | A47K 11/06 4/483 |
| 6,829,788 B1 | * | 12/2004 | Allen | A47K 11/06 4/483 |
| 7,347,693 B2 | * | 3/2008 | Low | G07F 1/06 434/236 |
| 7,540,741 B2 | * | 6/2009 | Kemp | A47K 10/16 434/247 |
| 7,543,339 B1 | * | 6/2009 | Harris | E03D 9/085 4/420.5 |
| 7,878,878 B2 | * | 2/2011 | Massaro | A63H 3/24 369/30.02 |
| 8,695,716 B2 | * | 4/2014 | Ravensbergen | E21B 34/102 166/319 |
| 2004/0172743 A1 | * | 9/2004 | Crerar | A47K 13/24 4/242.1 |
| 2006/0130230 A1 | * | 6/2006 | Lalicata | A47K 13/24 4/661 |

FOREIGN PATENT DOCUMENTS

| | | |
|---|---|---|
| JP | 10286196 A | 10/1998 |
| JP | 2008061777 A | 3/2008 |

* cited by examiner

INTERACTIVE TRAINING DEVICE

This non-provisional application, which is timely filed on the next business following a Saturday or Sunday wherein the date of filing is in accordance with extended period pendency 37 C.F.R. 1.7, claims priority from the provisional application, filed Apr. 19, 2013 under Ser. No. 61/814,116. This non-provisional application also claims priority with the provisional application, filed Oct. 24, 2013 under Ser. No. 61/895,395.

BACKGROUND OF THE INVENTION

1. Field of the Invention

The present invention relates to educational devices and toys, and more specifically, educational toys for toilet training that are compactable for storage when not in use.

2. General Background and State of the Art

The toilet training products that exist today tend to focus on the child (i.e. infant/toddler/preschooler) learning to toilet train on a toy version of a "flush toilet" where the toy version of the toilet has no flushing mechanism and drainpipe. Whether using the toy version toilet or an actual toilet, traditional toilet training methods involve the child being required to sit in an "adult style" manner over the toilet bowl wherein the child is facing away from the toilet's cistern or flushing mechanism components. Sitting in this manner substantially reduces the child's sensory and cognitive perception of the physical presence and functionality of the flush toilet. By attempting to teach children to use the toilet in this adult style, children ultimately have less appreciation of the toilet and may establish an early aversion towards using the toilet. Training that requires adult style toilet use only further delays the child's potty training and provokes greater anxiety in the parent and child. Traditional training results in parents spending more money on diapers and ineffective training products.

A child who learns how to say "no" coupled with a child's early reasoning skills are further delayed in their training because they are capable of expressing refusal to use a flush toilet. Such aversion for a flush toilet may arise from the child having a very limited perception and appreciation of the flush toilet. Jean Piaget (the world renowned child psychologist) spoke of Object Constancy, which explains that to a child, an object that he/she cannot see does not exist. When a child begins to use a flush toilet or toy version of a toilet and is instructed to turn their back away from the toilet during its use, the toilet immediately ceases to exist in their minds. Their purpose of sitting on the toilet is lost. No reward or motivation is offered to have the child sit and engage with the toilet long enough to increase their sensory and cognitive perception of the flush toilet. Offering a reward or motivation to spend more time on the toilet with a greater perception of the toilet will allow the child to become more familiar with the toilet and resolve the problems that are encountered using the traditional methods of toilet training.

The toilet training products that exist today tend to focus on the child learning to toilet train on a toy version of a flush toilet or by sitting "adult style" on a flush toilet with some type of child seat insert. While some of these products are constructed with playful colors and shapes, the child ultimately loses focus of the flush toilet because the adult style use of the toilet effectively eliminates all view and perception of the toilet.

Toilet training adult style also has its risks which make the parent and child more anxious each time they train. The toilet lid may inadvertently fall on to the child. In some instances, a child may fall into the toilet bowl since there is nothing the child can hold on to for added support and security. Keeping the child focused on the toilet lid, flushing mechanism, or cistern as well as securing the toilet lid from falling down would reduce or eliminate such risk, and thus eliminate the anxiety. With less fear, the child would learn to appreciate the use of the flush toilet.

Even after children learn how to use the flush toilet, they often later refuse to go back on the toilet. Children do not associate using the flush toilet with reward and entertainment. Children exhibit regressive behavior in using the flush toilet and parents are often forced to buy diapers such as "Pull Ups®" diapers for toddlers and pre-school children, in order to offset many "mistakes" children may encounter. An internet search for "toilet training" demonstrates that "Pull Ups®" are also one of the first hits for sponsored websites which demonstrates how the market has responded to the parent's insecurity about the inadequacies in flush toilet training.

It is desirable to have a device that will help a child realize the existence of a flush toilet through the reward of fun and enjoyment. Further, the desired device would build a positive association and durable long-lasting lesson thereby making parents feel more secure with their child's toilet training.

INVENTION SUMMARY

One of the inventors, as one of twelve children, has never understood why parents are not toilet training their children the way his mother had trained him and his siblings in using a flush toilet. The interactive device of the present invention works with a flush toilet training called Reverse Toilet Training (RTT). With RTT, a child is positioned over the toilet bowl in a reverse fashion, i.e., facing the rear of the toilet where the toilet lid and flushing mechanism may be located. The flushing mechanism may include the toilet cistern, piping leading up to a raised cistern, a flushing valve stem and handle commonly found on commercial toilets, the flushing handle, or the flush button.

Sitting with his/her legs straddling the toilet seat or squatting over the toilet bowl, the child is looking straight into the rear of the flush toilet wherein the child may view the flushing mechanism or the raised and upright toilet lid and/or the toilet cistern. The present invention is an accessory to a flush toilet in which an interactive device is positioned at the rear of the toilet and may be attached (e.g. suction cups, adhesive, or straps that wrap around the toilet lid or cistern) to the rear of the toilet. The present invention may be an interactive device such as a toy/game with which the child may play while learning to use the toilet. The child may also continue to use the interactive device when not using the toilet wherein said interactive device is detachable from the toilet. The present invention makes "going to the bathroom" enjoyable for both the child and parent, while educating the child to appreciate and use a flush toilet.

In an alternative embodiment of the present invention, an insert may be placed onto the top of the toilet bowl or toilet seat. The insert may reduce the diameter of the opening of the toilet bowl, thereby reducing the chance a child may fall into the toilet. The insert will give the child the orientation needed to "go to the bathroom" in the reverse position. An insert may be configured as a child seat insert with a supportable back, lower plush grooved areas for the child's legs/thighs, and with a barrier on the side of the insert in which the child is facing to avoid any possible urination mistakes. The present invention may be completely sanitary, easy to use, and easy to attach without altering the fun way for the child and parent to approach toilet training.

When the child is sitting on the toilet in the reverse training manner, the invention may also comprise of foot rests or interactive components with the feet. These components may be part of the interactive device or connected to the insert configured for reverse positioning on the toilet. The foot rests or interactive components with the feet may also provide greater stability while using the toilet.

Alternatively, the insert may be configured for a child squatting over the toilet bowl. The insert may have a leveled rim where the child may position their feet such that they are over the toilet bowl opening. To increase stability, the leveled rim may have foot pads that are lined with materials that are tacky to the touch or a construction such as a plurality of grooves that increase traction of the child's feet. The leveled rim may have interactive features such as pressure activated sensors that activate music, lights, or other stimulating effects to keep the child engaged with the toilet. The insert may have a back portion configured for squatting that may provide greater support and safety, and a front barrier on the side of the insert to avoid any possible urination mistakes.

If the interactive device is separate from the insert, then the interactive device may be removed from the rear of the toilet and attached to the insert for compact transport and storage. The attachment may be through an interlocking connector system between the two components. In one alternative embodiment, the back surface of the interactive device may fit into a corresponding space on the back of the insert. Straps attached to the interactive device may be used to secure the interactive device to the insert. Said straps may also be used to strap the interactive device to the toilet. Alternatively, the straps may be retractable for more compact storage.

The interactive device may be positioned at the rear of the toilet by the use of at least one support arm and at least one base. The base provides stability to hold the interactive device and support arm upright for comfortable operation of the interactive device. The support arm may be telescopic or extendable to adjust for the child's dimensions. The support arm may be extended by adding support arm extenders wherein each extender has an interlocking connection with support arm, other extenders, and the interlocking device. Furthermore, the base may also have adjustable positioning of the support arm such as a plurality of slots each configured to hold the support arm at difference distances from the user. The base and the support arm may be connected by a hinge or an equivalent connector that would allow the support arm to fold down on to the base. This movement would enable the interactive device to fold on to the base for more compact storage.

In an alternative embodiment of the present invention, the interactive device may be connected to the insert. The insert may be connected to the aforementioned base. The insert may also act as the base itself. The support arm may be interconnected by a hinge and the interactive device would fold on to the insert. The folded configured may be secured through an interlocking connector system.

In an alternative embodiment of the present invention, the interactive device may have a reward feature wherein the child may access the reward feature after they have completed using the flush toilet. The reward feature may be associated with the flushing mechanism of the flush toilet wherein the association may be through the interactive device being capable of releasing the flush valve. This feature will enable the child to understand the benefits of using the toilet as well as to familiarize themselves with flushing the toilet.

The present invention may also be configured for special needs individuals such as but not limited to autistic teens, and for healthy adults. The present invention may also be used to provide such users flush toilet training, physical support, convenience, and but not limited to, entertainment.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

Figure 1:
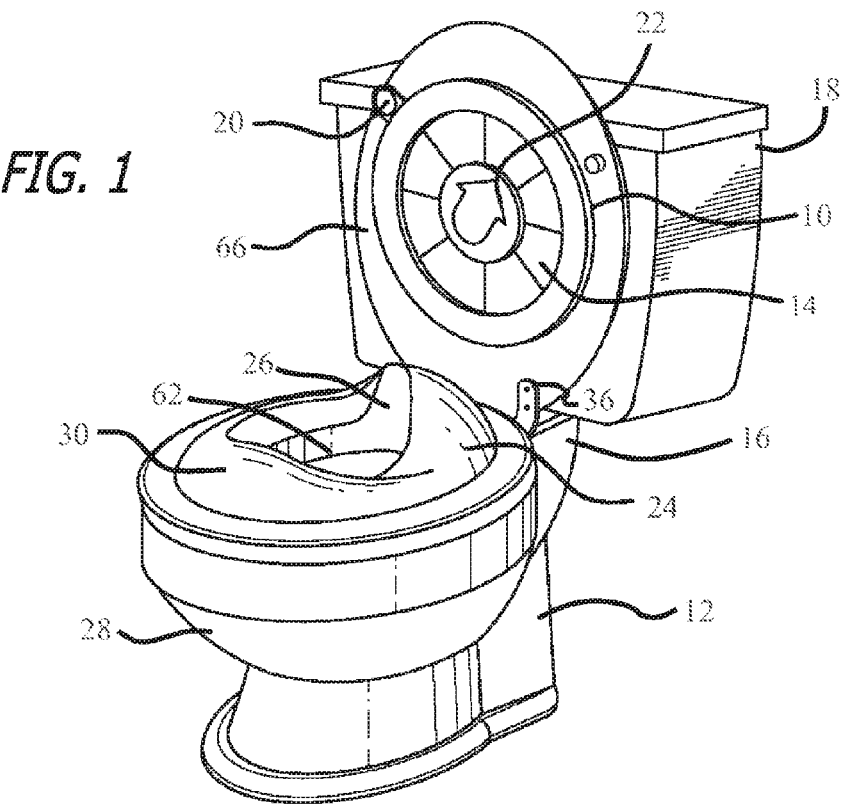
FIG. 1 a perspective view of a first embodiment of the present invention which includes a separate insert and an interactive device that is fastened to a toilet.

The invention will now be described with reference to FIG. 1, which is a front perspective view of an interactive device 10 and a flush toilet 12 wherein the interactive device 10 is a toy 14 attached to the inside of a toilet lid 66. The interactive device 10 is placed on the rear 16 of the flush toilet 12 wherein the rear 16 may comprise of flushing mechanism. The flushing mechanism may comprise of a cistern 18, a flush handle, and a flush valve. The interactive device 10 may be used on flush toilets without a cistern 18 or without a toilet lid 66. The interactive device 10 may be used on flush toilets with only a flush valve commonly found on commercial toilets. The interactive device 10 may be used on flush toilets wherein the cistern 18 is detached from the flush toilet 12.

The interactive device 10 may be constructed out of PVC or any other equivalent materials. The interactive device 10 may be attached to the inside of toilet lid 66 by suction cups, adhesive, elastic ties, or any other equivalent methods of attachment. The interactive device 10 may be attached to the toilet lid 66 by having support frame secured by utilizing the existing screws of the lid's hinges 36 wherein the lid's hinges 36 are originally used to connect the toilet lid 66 to the toilet bowl 28. Secure positioning of the toy 14 enables the user to operate the interactive device 10. The user may pull a lever 20 on the toy 14 and activate a spinning pointer 22 to illicit an entertaining and/or educational response from the toy 14. Other embodiments of the interactive device 10 may include but are not limited to a toy steering wheel with dash board displays or animated characters. The various equivalent embodiments may include responsive lights, sounds, music, pictures, videos, and various materials that provide tactile variety. The toy 14 should be made of easily washable materials that are inherently hygienic, such as non-porous PVC.

An insert 24 may be used in combination with the interactive device 10. In the preferred embodiment of FIG. 1, the insert 24 may be of a soft, viscoelastic material. The insert 24 may also be filled with a cushiony filler, such as a corn based material or gel. The exterior of insert 24 may be composed of a more semi-rigid material such as PVC or any other equivalent materials that are easily washable and/or inherently hygienic. The insert 24 may be contoured so that the child may sit comfortably facing the Interactive device 10. The insert 24 may also be configured to have a barrier 26 that acts as a splash guard for any toilet use related accidents or spills.

The insert 24 may also have support features that would prevent the child from falling into the bowl 28 while sitting in a reverse position or falling off the bowl 28 such as a support backing 30. The insert 24 may have handles or foot pads to provide the child with greater stability. The insert 24 may have an inner rim 62 in the insert opening that extends downwardly into the bowl and prevents the insert 24 from being displaced from the top of the bowl 28. The insert 24 may have straps or equivalent means of securing the insert 24 to the top of the bowl. The insert 24 may be placed on top of an adult toilet seat commonly found on flush toilets.

In an alternate embodiment, the insert may be configured for a child to squat over the bowl. The insert would be configured with stable regions in which the child can squat with sufficient stability and a low risk of slipping.

Figure 2:
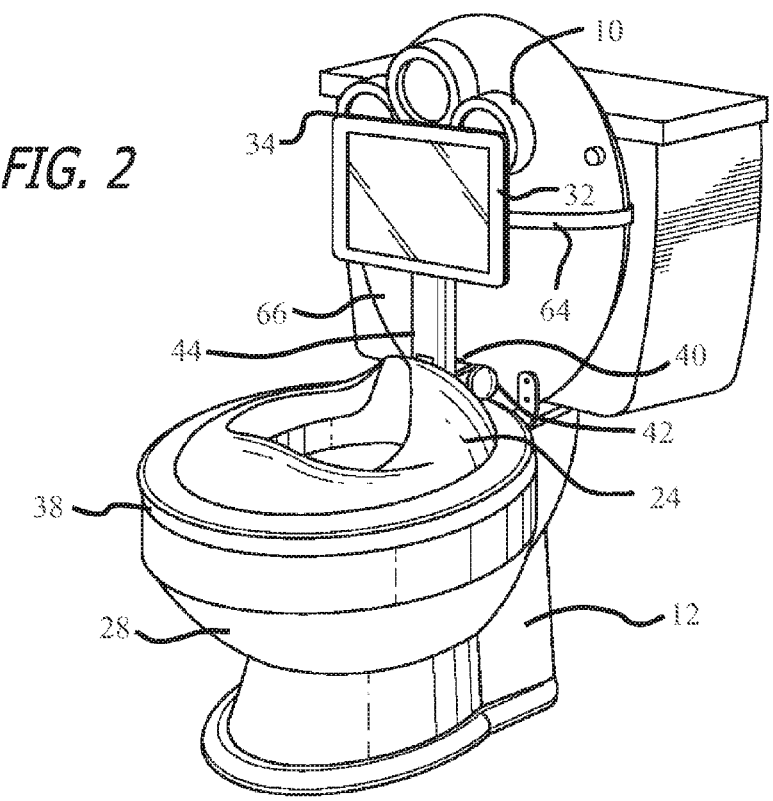
FIG. 2 a perspective view of an alternative embodiment of the present invention which includes a computer tablet connected to a support arm, a hinge, and a base.

FIG. 2 is a front perspective view of another embodiment of the interactive device 10 wherein said interactive device may comprise of a computer tablet 32. The interactive device 10 may be any computing device and may be removable from a frame 34 of the interactive device 10. The embodiment may also be one complete integrated unit, with the insert 24 attached to the interactive device 10. The interactive device 10 portion may be fastened to the toilet lid 66 by straps 64 or any other equivalent means. The interactive device 10, combined with the insert 24 and connected to the toilet lid 66 allows the child to sit more comfortably facing the rear 16, avoids any possibility of urine splash, and allays any parental concerns about the child falling into the bowl 28 while sitting in a reverse position, or the toilet lid 66 falling down on to the child.

Figure 3:
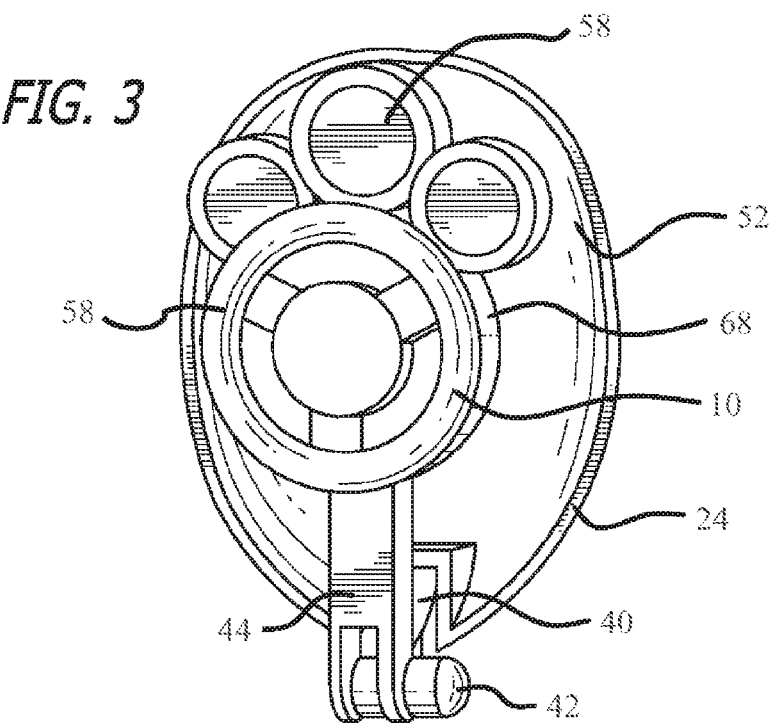
FIG. 3 is a perspective view of an embodiment similar to that of FIG. 2 in which the present invention is folded into a more compact configuration of the invention.
Figure 4:
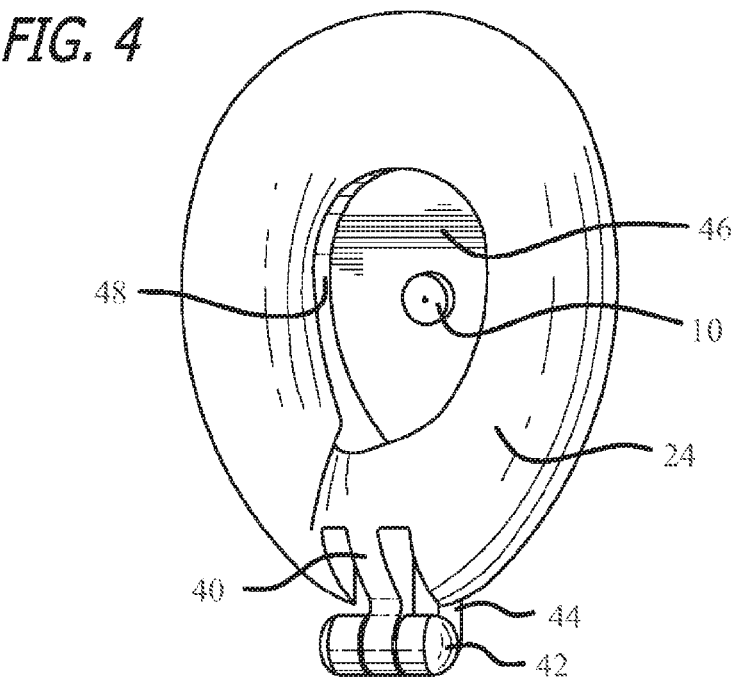
FIG. 4 is a perspective view of the embodiment of FIG. 3 that shows the other side of the present invention in its compact configuration.

The attached insert 24 is connected to a base 40 which is connected to a hinge 42. The hinge 42 is connected to a support arm 44, wherein the support arm 44 is connected to the interactive device 10. The hinge 42 is configured such that the support arm 44 does not rotate downwardly to the insert 24 thereby preventing the toilet lid 66 from being lowered on top 38 of the bowl 28. Rather, the hinge 42 is only able to rotate the support arm 44 when the unit is removed from the flush toilet 12 and folded in such a manner as shown in FIGS. 3 & 4. The base 40 and the support arm 44 may also be connected by other bendable connectors or may be connected in a rigid manner where no rotation of the support arm is possible 44, as shown in an alternate embodiment in FIG. 5.

FIG. 3 and FIG. 4 are perspective views of another embodiment of the interactive device 10 with an attached insert 24, and a base 40, a hinge 42, and a support arm 44. In this embodiment, the hinge rotates in one direction such that the bottom side of the insert 24 faces the back surface 46 of the interactive device 10. The hinge 42 allows the attached insert 24 to fold on to the interactive device 10 when the interactive device 10 is not in use. The preferred embodiment comprises a hinge that may be capable of locking into the upright position when in use, as shown in FIG. 2, and also lock into a folded configuration when not in use in FIG. 3 and FIG. 4.

In FIG. 3 and FIG. 4, the folded configuration enables the interactive device to be easily transported or stored when not in use. The folded configuration allows any surfaces on the insert 24 which may be commonly soiled not to directly touch the interactive parts 58 of the interactive device 10. In FIG. 4, the back surface 46 of the interactive device 10 fits against the rim 48 of the attached insert 24 wherein there is a reduced chance of any soiling of the front surface 50 of the interactive device 10. The back surface 46 of the interactive device 10 is preferred to have side walls 68 wherein said side walls 68 cup the back surface 46 and fit around the rim 48 of the attached insert 24. In FIG. 3, the under surface 52 of the attached insert 24 may be concaved such that back surface's 46 sides walls can be inserted within the cavity created by the concaved shape of the under surface 52 of the attached insert 10.

Figure 5A:
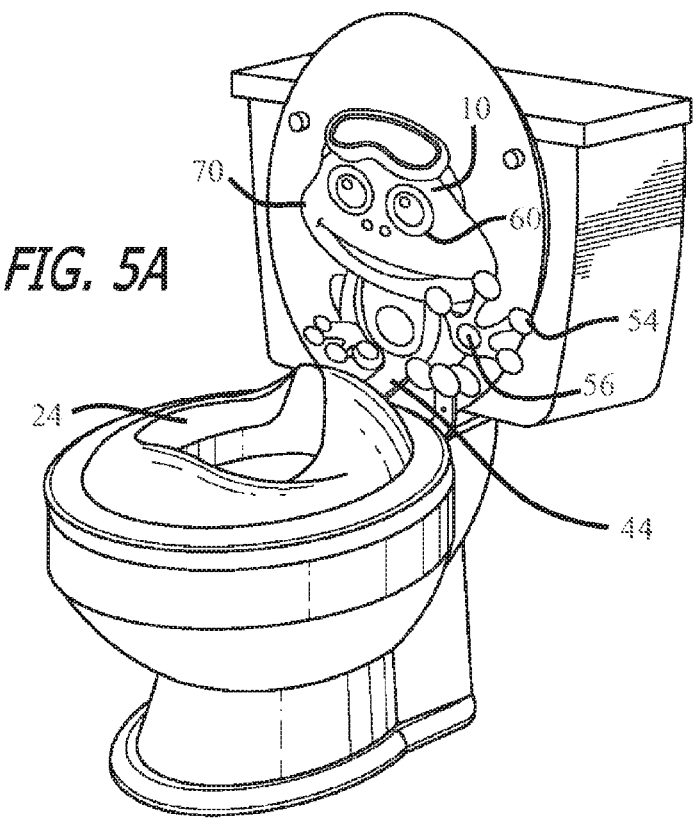
FIG. 5A and FIG. 5B is a perspective view of an embodiment with a reward feature and an unbendable support arm.
Figure 5B:
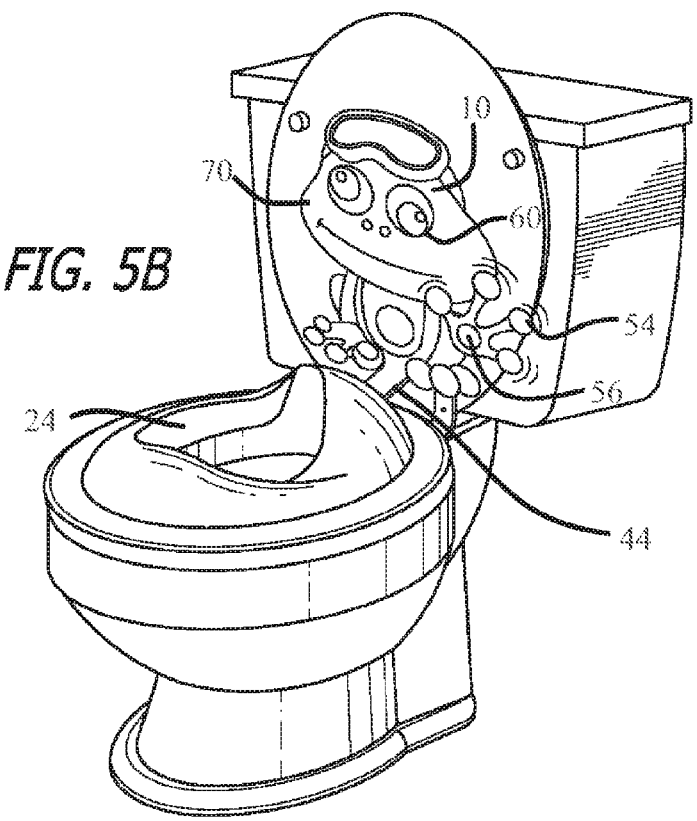

FIG. 5A and FIG. 5B is a perspective view of another embodiment of an interactive device 10 wherein the interactive device 10 has an interactive feature 54 that may be used to reward the child when the child has finished using the flush toilet. The interactive feature 54 may be configured as a hand 56 of an animated character 70 wherein the user may give a "high five" to the hand 56, and the "high five" triggers an audible reward and/or visual reward response 60. The interactive feature 54 may also be a handle that turns gears and may trigger a reward response 60 which may include but is not limited to animated movements such as eye movement, sounds, music, and lights. The handle may be conformed similar to the shape of the actual flush toilet handle wherein the user familiarizes themselves with the act of flushing a toilet. The interactive feature 54 may even be connected to the flushing mechanism of the toilet, and thereby control the flushing mechanism.

FIG. 5A and FIG. 5B also show a rigid and bent support arm 44 connected to the interactive device 10 and the insert 24. The rigid support arm 44 prevents the lid 66 from falling down.

While the specification describes particular embodiments of the present invention, those of ordinary skill can devise variations of the present invention without departing from the inventive concept.

What is claimed as new is:

1. An interactive device to be used in combination with a flush toilet comprising: at least one interactive component that may be operated by a user of the flush toilet and the at least one interactive component is positioned at a rear area of the flush toilet an insert that is configured to fit securely atop a bowl of the flush toilet and the insert reduces the dimensions of an opening of the bowl; and a support arm attached to the interactive component; a base that is attached to the support arm and to the insert, and the base having means for moving the interactive component closer or further away from the insert.

2. The interactive device in claim 1 wherein said interactive device includes a toy.

3. The interactive device in claim 1 wherein said interactive device includes a computer wherein the user operates software programs on said computer.

4. The interactive device of claim 1 wherein the base having a least one axis of rotation that allows the interactive component to move around the at least one axis of rotation.

5. The interactive device in claim 1 wherein the insert includes a cushion.

6. The interactive device of claim 1 comprising handles or foot pads to provide a user with greater stability while operating the interactive device.

7. The interactive device of claim 1 comprising a barrier that acts as a splash guard.

8. An interactive device to be used in combination with a flush toilet comprising: at least one physical component that is operated by a user of the flush toilet, the physical component being constructed in part with a rigid material;

the physical component being removably attached to a lid of a bowl of the flush toilet when the lid is in an open position; and a restraint system that prevents the lid from being moved into a closed position.

9. The interactive device of claim 8 wherein said interactive device includes a toy.

10. The interactive device in claim 8 wherein said interactive device includes a computer wherein the user operates software programs on said computer.

11. The interactive device of claim 8 comprising an insert fitting securely atop the bowl.

12. The interactive device of claim 8 comprising a support arm connected to said interactive device and to a base.

13. The interactive device in claim 12 wherein said support arm is attached to the base through a connector having an axis of rotation, said interactive device moving around the axis of rotation relative to said base.

14. The interactive device of claim 13, wherein said base is connected to an insert that fits securely atop the bowl.

15. A method of training a user to use a flush toilet with steps of:
   a. providing a user with an interactive device attached to a flush toilet, said flush toilet including at least a bowl, a flushing mechanism, a front and a rear including a majority of the flushing mechanism, said bowl having a drain pipe and a water inlet;
   b. placing the interactive device at said rear of the flush toilet wherein the interactive device is attached to a support arm, and said support is connected to a base, said base is configured to securely hold the interactive device in a position that allows the user to access the interactive device when the user is facing the rear of the flush toilet;
   c. placing an insert atop the bowl,
   d. permitting the user to become more accustomed with the physical presence of the flush toilet by mounting the user atop the insert such that the user faces the rear of the flush toilet; and
   e. allowing the user to operate said interactive device thereby enhancing the user's perception of the physical presence of the toilet while operating said interactive device.

16. The method of claim 15 wherein the interactive device includes a toy.

17. The method of claim 15 wherein the interactive device includes a computer wherein the user operates software programs on said computer.

18. The method of claim 15 wherein said placing step comprises securing the interactive device to the toilet.

19. The method of claim 15 comprising an additional step in which the interactive device is removed from the toilet.

20. The method of claim 15 further comprising providing the user an interactive reward after the user successfully interacts with the interactive device.

* * * * *